US012228921B2

(12) United States Patent
Lin et al.

(10) Patent No.: US 12,228,921 B2
(45) Date of Patent: Feb. 18, 2025

(54) MULTIPLE-VARIABLE PREDICTIVE MAINTENANCE METHOD FOR COMPONENT OF PRODUCTION TOOL AND NON-TRANSITORY TANGIBLE COMPUTER READABLE RECORDING MEDIUM THEREOF

(71) Applicant: NATIONAL CHENG KUNG UNIVERSITY, Tainan (TW)

(72) Inventors: Chin-Yi Lin, Taipei (TW); Yu-Ming Hsieh, Kaohsiung (TW); Fan-Tien Cheng, Tainan (TW); Hsien-Cheng Huang, Taoyuan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 385 days.

(21) Appl. No.: 17/664,874

(22) Filed: May 25, 2022

(65) Prior Publication Data
US 2022/0291675 A1 Sep. 15, 2022

Related U.S. Application Data

(63) Continuation-in-part of application No. 16/857,178, filed on Apr. 24, 2020, now Pat. No. 11,378,946.

(30) Foreign Application Priority Data

Apr. 26, 2019 (TW) .................................. 108114804
Mar. 22, 2022 (TW) .................................. 111110667

(51) Int. Cl.
*G05B 23/02* (2006.01)
(52) U.S. Cl.
CPC ....... *G05B 23/0283* (2013.01); *G05B 23/024* (2013.01); *G05B 23/0294* (2013.01)

(58) Field of Classification Search
None
See application file for complete search history.

(56) References Cited

U.S. PATENT DOCUMENTS 4,658,245 A * 4/1987 Dye .................. G05B 19/4065
451/5
6,928,398 B1 8/2005 Fang et al.
(Continued)

FOREIGN PATENT DOCUMENTS

CN 1361861 A 7/2002
CN 103675525 A 3/2014
(Continued)

OTHER PUBLICATIONS

Mahan et al., "White Noise Test: detecting autocorrelation and nonstationarities in long time series after ARIMA modeling," Jun. 2015, Proc. of the 14th Python in Science Conf., pp. 100-102.

*Primary Examiner* — David Earl Ogg
(74) *Attorney, Agent, or Firm* — CKC & Partners Co., LLC

(57) ABSTRACT

Embodiments of the present invention provide a multiple-variable predictive maintenance method for a component of a production tool and a computer program product thereof, in which a multiple-variable time series prediction ($TSP_{MVA}$) and an information criterion algorithm are adapted to build a best vector autoregression model (VAR), thereby forecasting the complicated future trend of accidental shutdown of the component of the production tool. Therefore, the multiple-variable prediction of the present invention can improve the accuracy of prediction compared with the single-variable prediction.

18 Claims, 8 Drawing Sheets

(56) References Cited

U.S. PATENT DOCUMENTS

| | | | |
|---|---|---|---|
| 7,593,912 | B2 | 9/2009 | Cheng et al. |
| 7,603,328 | B2 | 10/2009 | Cheng et al. |
| 8,095,484 | B2 | 1/2012 | Cheng et al. |
| 8,688,256 | B2 | 4/2014 | Cheng et al. |
| 8,862,525 | B2 | 10/2014 | Cheng et al. |
| 8,983,644 | B2 | 3/2015 | Cheng et al. |
| 10,242,319 | B2 | 3/2019 | Cheng et al. |
| 2002/0013687 | A1 | 1/2002 | Ortoleva |
| 2006/0095292 | A1 | 5/2006 | Cumming |
| 2006/0129257 | A1* | 6/2006 | Chen ................. G05B 19/4188 700/121 |
| 2006/0161403 | A1 | 7/2006 | Jiang et al. |
| 2014/0025315 | A1* | 1/2014 | Cheng ..................... G06N 7/00 703/3 |
| 2015/0180740 | A1 | 6/2015 | Yoshida |
| 2016/0349736 | A1* | 12/2016 | Cheng .............. G05B 19/41875 |
| 2017/0076216 | A1* | 3/2017 | Akrotirianakis ......... G06N 7/01 |
| 2018/0272491 | A1 | 9/2018 | Yang et al. |
| 2020/0116553 | A1* | 4/2020 | Hsia ........................ G01D 1/16 |
| 2020/0133830 | A1 | 4/2020 | Sharma et al. |
| 2021/0048807 | A1 | 2/2021 | Zhou et al. |

FOREIGN PATENT DOCUMENTS

| | | | |
|---|---|---|---|
| CN | 106089753 | A | 11/2016 |
| CN | 108535656 | A | 9/2018 |
| CN | 108681277 | A | 10/2018 |
| CN | 109063366 | A | 12/2018 |
| CN | 109145773 | A | 1/2019 |
| CN | 109165396 | A | 1/2019 |
| TW | 200716504 | A | 5/2007 |
| TW | 201411763 | A | 3/2014 |
| TW | I481978 | B | 4/2015 |
| TW | I521360 | B | 2/2016 |
| TW | I539298 | B | 6/2016 |

\* cited by examiner

MULTIPLE-VARIABLE PREDICTIVE MAINTENANCE METHOD FOR COMPONENT OF PRODUCTION TOOL AND NON-TRANSITORY TANGIBLE COMPUTER READABLE RECORDING MEDIUM THEREOF

CROSS-REFERENCE TO RELATED APPLICATIONS

The present application is a Continuation-in-part of U.S. application Ser. No. 16/857,178, filed Apr. 24, 2020, which claims priority to Taiwan Application Serial Number 108114804, filed Apr. 26, 2019, and also claims priority to Taiwan Application Serial Number 111110667, filed Mar. 22, 2022, all of which are herein incorporated by reference.

BACKGROUND

Field of Invention

The present invention relates to a multiple-variable predictive maintenance method for a component of a production tool and a non-transitory tangible computer readable recording medium thereof. More particularly, the present invention relates to a multiple-variable predictive maintenance method for a component of a production tool based on remaining useful life (RUL) prediction and a non-transitory tangible computer readable recording medium thereof.

Description of Related Art

Production equipment is an essential part for any manufacturing factory. Failure of a component, a module, or a device (such as a heater, a pressure module, and a throttle valve, etc.) in the production equipment may cause production abnormalities which lead to poor product quality and/or low production capacity and thus cause significant losses.

In general, the most-commonly utilized approach for remedying the aforementioned problems is to perform scheduled preventive maintenance (PM). That is, to execute maintenance-related operations at a predetermined time interval. The predetermined time interval is basically decided according to the mean-time-between-failure (MTBF) of the target device (TD). As such, how to schedule a proper PM is usually a key issue for the factories. An improper scheduled PM may increase the maintenance cost or lower the production capacity.

Predictive maintenance aims to find out when the target device (TD, such as a component of a production tool) is sick and about to die before its occurrence to conduct just-in-time maintenance, so as to avoid unexpected TD down time. In this way, not only tool availability and manufacturing quality are improved, but also the additional cost of excessive maintenance in preventive maintenance strategy can also be reduced.

To improve equipment maintenance programs for increasing fab performance, the International SEMATECH Manufacturing Initiative (ISMI) proposed an initiative of predictive and preventive maintenance (PPM). As defined by ISMI, PPM includes preventive maintenance (PM), condition-based maintenance (CbM), predictive maintenance (PdM), and breakdown maintenance (BDM). Among them, the ISMI claimed that CbM and PdM capabilities should be developed and available as an individual module or incremental modules so that an end user can choose to implement one, some, or all of the capabilities. CbM is defined as: "Maintenance is performed after one or more indicators show that equipment is going to fail or that equipment performance is deteriorating." The technique of fault-detection-and-classification (FDC) is an approach related to CbM and is defined as: "Monitoring equipment and factory data to assess equipment health, and invoking warnings and/or tool shutdown when a fault is detected." On the other hand, PdM is the technique of applying a predictive model to relate facility-state information to maintenance information for forecasting the remaining useful life (RUL) and the need for maintenance events that will alleviate unscheduled downtime.

In some conventional technologies, only a single feature is used to predict the aging feature of the target device, and then the RUL of the target device is judged. Therefore, how to increase the accuracy of the prediction is a topic of concern to a person skilled in the art.

SUMMARY

Due to the limitations of the conventional algorithm, when TD is about to die, if the TD's aging feature suddenly rises or becomes smooth, the exponential model may not be able to keep up with the real-time prediction or even falsely predicts a long RUL for the TD.

An object of the present invention is to provide a multiple-variable predictive maintenance method for a component (TD) of a production tool and a non-transitory tangible computer readable recording medium thereof for accurately predicting the RUL of the component of the production tool in real time, thereby performing maintenance on the component of the production tool in time.

Another object of the present invention is to provide a multiple-variable predictive maintenance method for a component (TD) of a production tool and a non-transitory tangible computer readable recording medium thereof for performing maintenance immediately when the component is very likely to enter a dead state, and quantitatively showing the possibility of the component entering the dead state, by using a pre-alarm scheme and a death related indicator (DCI).

According to an aspect of the present invention, a multiple-variable predictive maintenance method is provided. In the multiple-variable predictive maintenance method, at first, plural sets of process data used or generated by a component of a production tool are obtained when plural workpieces are processed in sequence, in which each of the sets of process data includes values of plural parameters, the values of each of the parameters in each of the sets of process data is a set of time series data values within a period of processing time when the component of the production tool is processing one of the workpieces, and the sets of process data are one-to-one corresponding to the sets of workpieces. Then, plural event indicative values are obtained according to if an abnormal event occurs when the component is processing each of the workpieces, in which the event indicative values are one-to-one corresponding to the sets of process data. Thereafter, the set of time series data values of each of the parameters in each of the sets of process data is converted to a value of a parameter indicator by using plural algorithms respectively, in which the parameter indicators are one-to-one corresponding to the parameters. Then, a correlation analysis between each of parameter indicators and the event indicative values is conducted, thereby obtaining plural correlation coefficients one-to-one corresponding to the parameter indicators. Thereafter, one of the parameter indicators that is corresponding to a maximum one of the correlation coefficients is selected as an aging feature, and an auxiliary aging feature is selected. Thereafter, a first determination operation is performed to determine if the component is in a sick state according to the value of the aging feature corresponding to each of the workpieces, in which one of the workpieces is set as a sample selection point once the component is in the sick state when processing the one of the workpieces. Then, a multiple-variable model-building operation is performed. In the multiple-variable model-building operation, N values of the aging feature and N values of the auxiliary aging feature are used as a set of model-building sample data, in which the N values of the aging feature are corresponding to N sets of the sets of process data belonging to successive N of the workpieces that are processed directly before the sample selection point, where N is a positive integer. Thereafter, a Granger causality test is performed on the aging feature and the auxiliary aging feature to determine a correlation between the aging feature and the auxiliary aging feature. If there is no correlation between the aging feature and the auxiliary aging feature, the auxiliary aging feature is deleted from the set of model-building sample data. Then, an aging-feature prediction model is built by using the set of model-building sample data in accordance a multiple-variable time series prediction algorithm, thereby obtaining plural predicted values of the aging feature that are arranged in a processing order. Thereafter, plural time points at which the component processes the workpieces respectively are obtained in accordance with plural process times used by the component for processing the workpieces respectively. Thereafter, a dead spec is obtained, in which the dead spec is a value of the aging feature used or generated by the component when the component cannot work. Then, an operation is performed to sequentially determine if the predicted values are substantially equal to the dead spec until an earliest one of the predicted values is found, in which one of the time points corresponding to the earliest one is a death time point at which the component cannot work. Then, an operation is performed to compute differences between the death time point and the respective time points at which the workpieces are processed, thereby obtaining plural predicted remaining useful life values ($RUL_t$), where t stands for the $t^{th}$ workpieces and t is an integer.

In some embodiments, in the first determination operation, the values of the aging feature in each of the sets of process data are first converted to plural device health indices (DHI) in accordance with a set of conversion formulas as follows:

when $\bar{y}_T < y_T < UCL$, $$DHI = \bar{y}_{T\_mapping} - \left(\frac{y_T - \bar{y}_T}{UCL - \bar{y}_T} \times \left(\bar{y}_{T\_mapping} - UCL_{\_mapping}\right)\right);$$

when $UCL < y_T < USL$, $$DHI = UCL_{\_mappng} - \left(\frac{y_T - UCL}{USL - UCL} \times \left(UCL_{\_mappng} - UCL_{\_mappng}\right)\right);$$

when $USL < y_T < \text{Max} y_T$, $$DHI = USL_{\_mappng} - \left(\frac{y_T - USL}{\text{Max} y_T - USL} \times \left(USL_{\_mappng} - \text{Max} y_{T\_mappng}\right)\right);$$

when $LCL < y_T < \bar{y}_T$,

-continued $$DHI = \bar{y}_{T\_mapping} - \left(\frac{\bar{y}_T - y_T}{\bar{y}_T - LCL} \times \left(\bar{y}_{T\_mapping} - LCL_{\_mappng}\right)\right);$$

when $LSL < y_T < LCL$, $$DHI = LCL_{\_mapping} - \left(\frac{LCL - y_T}{LCL - LSL} \times (LCL_{\_mapping} - LSL_{\_mapping})\right);$$

when $\text{Min} y_T < y_T < LSL$, $$DHI = LSL_{\_mapping} - \left(\frac{LSL - y_T}{LSL - \text{Min} y_T} \times (\text{Min} y_{T\_mapping} - LSL_{\_mapping})\right);$$

where $y_T$ represents the aging feature, $\bar{y}_T$ represents a mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{\_mapping}$ is a conversion value corresponding to the USL; and $UCL_{\_mapping}$ is a conversion value corresponding to the UCL. Then, an operation is performed to sequentially determine if the device health indices are greater or equal to a threshold value until an earliest one of the device health indices is found, in which one of the workpieces corresponding to the earliest one of the device health indices is set as the sample selection point.

In some embodiments, the multiple-variable model-building operation further includes building the aging-feature prediction model by using a vector autoregression (VAR) model as the multiple-variable time series prediction algorithm; selecting the biggest lag of the VAR model by using a partial autocorrelation function (PACF); performing a white noise test on the values of the aging feature in the set of model-building sample data, wherein when one of the values of the aging feature in the set of model-building sample data is a white noise, a value of the aging feature corresponding to another set of process data belonging to a $(N+1)^{th}$ workpiece processed before the sample selection point is added to the set of model-building sample data; creating a plurality of VAR model combinations by using the biggest lag of the VAR model; calculating an information quantity of each of the VAR model combinations by using an information criterion algorithm; and selecting one of the VAR model combinations that has the biggest information quantity as an optimal model.

In some embodiments, the information criterion algorithm is a Bayesian information criterion (BIC).

In some embodiments, the multiple-variable model-building operation further includes determining if variances of the values of the aging feature in the set of model-building sample data become larger with time, and performing a log transformation on each of the values of the aging feature in the set of model-building sample data when the variances of the values of the aging feature in the set of model-building sample data become larger with time; and performing a unit root test on the values of the aging feature in the set of model-building sample data to check if the values of the aging feature in the set of model-building sample data arranged in sequence is stationary, and performing a process of difference on each of the values of the aging feature in the set of model-building sample data when the values of the aging feature in the set of model-building sample data is not stationary.

In some embodiments, the unit root test is an augmented Dickey-Fuller test (ADF test) or a Kwiatkowski-Phillips-Schmidt-Shin (KPSS) test.

In some embodiments, the aforementioned predictive maintenance method further includes performing a second determination operation to determine if the component of the production tool needs replacement or maintenance. The second determination operation includes determining if $(RUL_t-RUL_{t-1})/RUL_{t-1}$ is greater than or equal to a threshold, thereby obtaining a first result, where t−1 stands for the $(t-1)^{th}$ workpiece; determining if $RUL_t$ is smaller than a maintenance buffer time, thereby obtaining a second result, in which the component of the production tool has to be maintained within the maintenance buffer time when being abnormal. When the first result and the second result both are false, the component of the production tool is in a sick state but does not deteriorate drastically, and no maintenance is needed. When the first result is false and the second result is true, the component of the production tool does not deteriorate drastically but its remaining useful life is sufficient, and maintenance is needed. When the first result is true and the second result is false, the component of the production tool deteriorates drastically, and if the first result for each of the $t^{th}$ workpiece to the $(t+i)^{th}$ workpiece that are successively processed by the component of the production tool is true and the second result for the for each of the $t^{th}$ workpiece to the $(t+i)^{th}$ workpiece is false, inspection or maintenance is needed, wherein i is a positive integer. When the first result and the second result both are true, the component of the production tool needs maintenance.

In some embodiments, the aforementioned multiple-variable predictive maintenance method further includes performing a second determination operation to determine if the component of the production tool needs replacement or maintenance. The second determination operation includes converting the predicted values of the aging feature to plural death correlation indices (DCI) in accordance with a set of conversion formulas as follows:

$$DCI_t = \frac{conv(y_{death}, y_{t-1})}{Var(y_{death})},$$

where $y_{death}$ is the predicted value of the aging feature when the component cannot work, $y_{t-1}$ is the value of the aging feature corresponding to the $(t-1)^{th}$ workpiece processed by the component, cony is a covariance computation, and Var is a variance computation; and when $DCI_t$ is greater than a threshold, it means that the component is near a dead state when processing the $t^{th}$ workpiece, in which the threshold is based on a standard error of $DCI_t$.

In some embodiments, the component includes a heater, a pressure module, a throttle valve, an oilless bushing or a bearing, and the parameters include a shaft deflection, a valve opening angle, a vibration amplitude, a driving voltage, a driving current, a temperature and/or a pressure.

In some embodiments, the parameter indicators include a k-times frequency feature (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value.

According to another aspect of the present invention, a non-transitory tangible computer readable recording medium storing instructions is provided. When the instructions is executed by a processor, the aforementioned multiple-variable predictive maintenance method is performed.

Hence, the application of the embodiments of the present invention can accurately predict the RUL of the component of the production tool in real time, so as to perform maintenance on the component of the production tool in time; and can perform maintenance immediately when the component is very likely to enter a dead state, and can quantitatively show the possibility of the component entering the dead state.

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

Figure 1A:
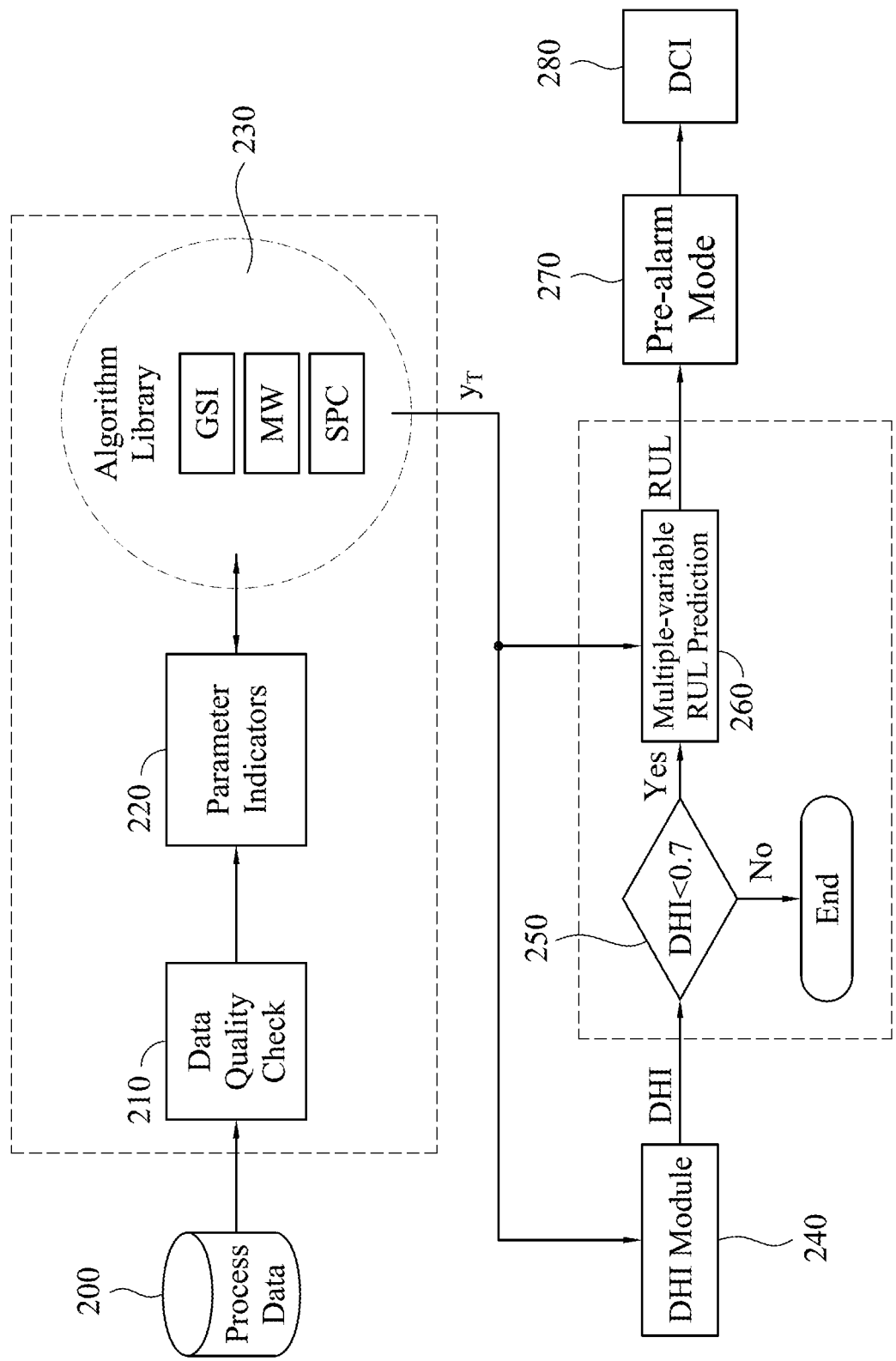
FIG. 1A is schematic block diagram for explaining a multiple-variable predictive maintenance method for a component of a production tool according to some embodiments of the disclosure.

Reference will now be made in detail to the embodiments of the present invention, examples of which are illustrated in the accompanying drawings. Wherever possible, the same reference numbers are used in the drawings and the description to refer to the same or like parts.

In a conventional technique, a single variable cannot represent the whole information of aging of the production tool. To solve the prediction inaccuracy problem of the single variable of the conventional technique, one embodiment of the disclosure provides a multiple-variable time series prediction ($TSP_{MVA}$) algorithm and adopts an information criterion algorithm to build an optimal vector autoregression (VAR) model, thereby predicting complicated future trends of unscheduled shutdown of the component of the production tool. Moreover, the conventional time series prediction (TSP) technique uses only single variable to make predictions, so the prediction accuracy is limited. On the contrary, the multiple-variable time series prediction of the present disclosure expands the limitation that only single variable is used, so that the predicted aging feature depends on not only the past aging feature, but also other feature (e.g., an auxiliary aging feature), thereby improving the prediction accuracy by using multiple variables. In addition, one embodiment of the disclosure provides an alarm scheme for performing maintenance immediately when the component is very likely to enter a dead state, and provides a death related indicator (DCI) for quantitatively showing the possibility of the component entering the dead state.

Referring to FIG. 1A, FIG. 1A is schematic block diagram for explaining a multiple-variable predictive maintenance method for a component of a production tool according to some embodiments of the disclosure. At first, plural sets of process data 200 used or generated by the component of the production tool when plural workpieces are processed in sequence by the component, in which each set of process data 200 includes values of plural parameters. The production tool is a tool processing the workpieces on a production line. The production line may be, for example, a semiconductor production line, a TFT-LCD production line, a machine tooling production line, etc.; the workpieces may be, for example, wafers, glass substrates, wheels, screws, etc.; the machine tool may be, for example, a film deposition tool, a photoresist coating tool, a machine tool, etc.; the component may be, for example, a heater, a pressure module, a throttle valve, an oilless bushing, a bearing, etc.; and the parameters includes a shaft deflection, a valve opening angle, a vibration amplitude, a driving voltage, a driving current, a temperature and/or a pressure, etc., for example. The aforementioned listed items are merely used as examples for explanation, and embodiments of the disclosure are not limited thereto. It is noted that the values of each of the parameters in each of the sets of process data 200 is a set of time series data values within a period of processing time when the component of the production tool is processing one of the workpieces, i.e., the values of each of the parameters may be shown as a curve of parameter values vs. time. The sets of process data 200 are one-to-one corresponding to the sets of workpieces.

Then, a data quality check is performed on the sets of process data 200 (step 210), thereby determining if the quality of each set of process data 200 is good. If any of the sets of process data 200 has poor quality, another set of process data used or generated by the component of the production tool when another workpiece is processed. Step 200 may adopt the algorithms similar to the process data quality evaluation scheme utilized in U.S. Pat. No. 8,095,484 B2. U.S. Pat. No. 8,095,484 B2 is hereby incorporated by reference.

Thereafter, the set of time series data values of each of the parameters in each of the sets of process data is converted to a value of a parameter indicator by using various algorithms in an algorithm library 230 respectively (step 220), in which the parameter indicators are one-to-one corresponding to the parameters. The parameter indicators include a k-times frequency (where k is greater than 0) after conversion to a frequency domain, a global similarity index (GSI), a kurtosis of statistic distribution, a skewness of statistic distribution, a standard deviation (STD), a root mean square (RMS), a mean value, a maximum value, and/or a minimum value. The conversion method of the parameter indicators may adopt a moving window (MW) method to determine the number of samples.

For example, each set of process data 200 includes a set of time series data of valve opening, and/or a set of time series data of vibration amplitude. A statistical process control (SPC) in the algorithm library 230 is used to convert the set of time series data of valve opening to a kurtosis of statistic distribution, a skewness of statistic distribution, and/or a standard deviation. A global similarity index (GSI) algorithm in the algorithm library 230 is used to convert the set of time series data of valve opening to a GSI value. A time-frequency domain conversion method in the algorithm library 230 is used to convert the set of time series data of vibration amplitude to a k-times frequency feature such as a frequency ×¼ feature, a frequency ×½ feature, a frequency ×2 feature, and/or a frequency ×4 feature. The GSI algorithm may refer to the algorithms disclosed in U.S. Pat. No. 8,095,484 B2. U.S. Pat. No. 8,095,484 B2 is hereby incorporated by reference. The aforementioned algorithms in the algorithm library 230 are merely used as examples for explanation, and embodiments of the disclosure are not limited thereto. In some embodiments, the frequency-domain methods and time-frequency domain methods may be fast Fourier transform (FFT) or discrete wavelet transform (DWT) etc. which can be used to transform time-domain data into the frequency-domain for deriving power spectral density features of different frequency bandwidths or to transform time-domain data into the time-frequency domain for deriving wavelet energy features of different wavelet nodes. For example, categories of (sample) feature data in frequency domain are [power spectral density 1(frequency ×¼)], [power spectral density 2(frequency ×½)], [power spectral density 3(frequency ×1)], [power spectral density 4(frequency ×2)], [power spectral density 5(frequency ×3)]. The utilization of the aforementioned FFT and DWT are well known to those who are skilled in the art, and are not described in detail herein.

Figure 1B:
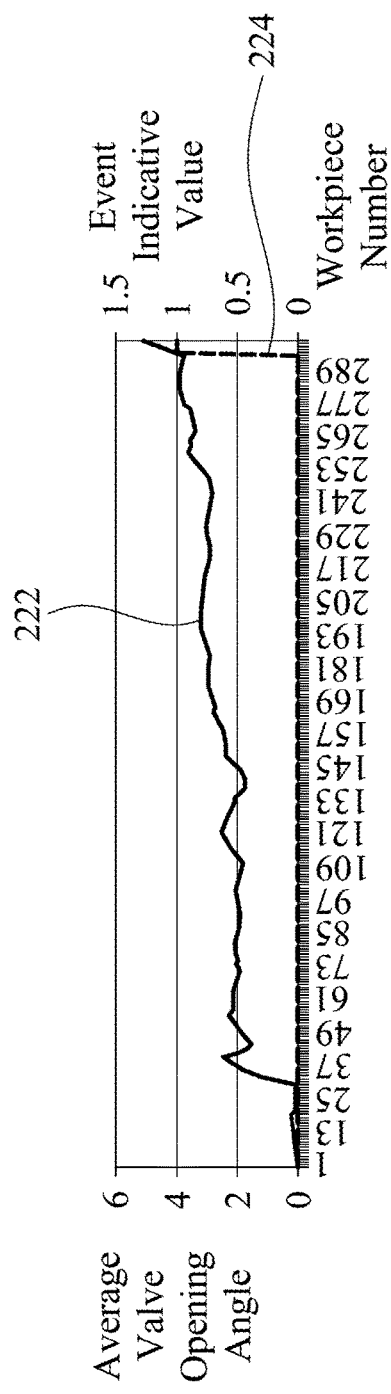
FIG. 1B shows a relationship between an event indicative value and a parameter indicator (an average opening angle of a throttle valve) according to some embodiments of the disclosure.
Figure 1C:
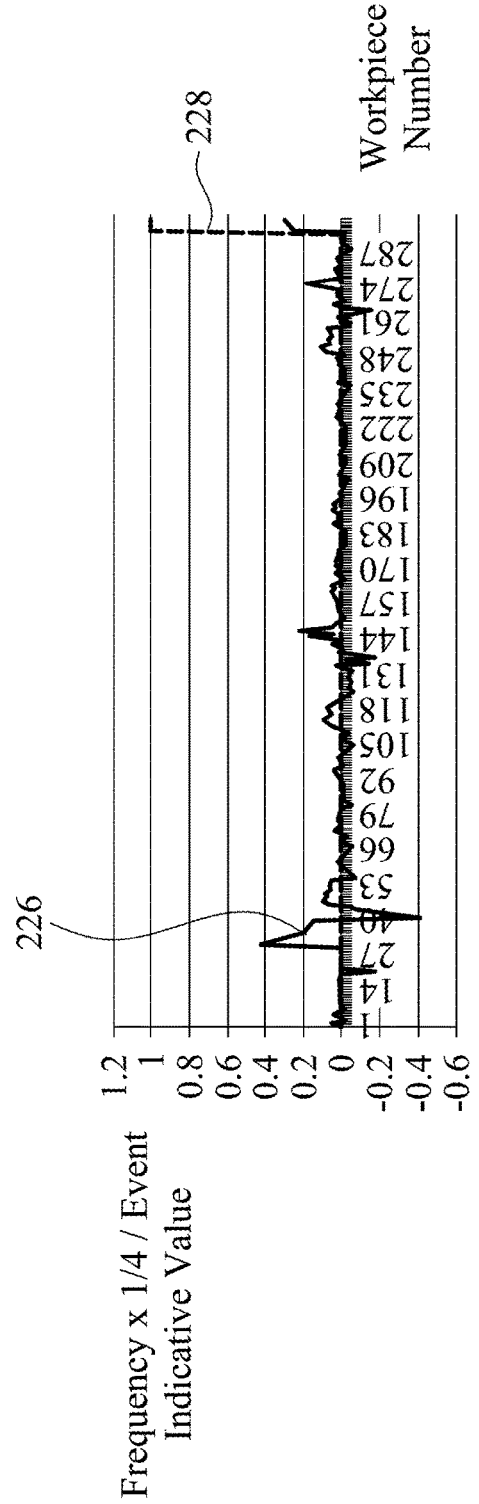
FIG. 1C shows a relationship between an event indicative value and a parameter indicator (a frequency ×¼ feature) according to some embodiments of the disclosure.

On the other hand, the method of the disclosure obtains plural event indicative values that are one-to-one corresponding to the sets of process data, in which the event indicative values indicate whether an abnormal event occurs when the component of the production tool is processing each of the workpieces. Referring to FIG. 1B, FIG. 1B shows a relationship between an event indicative value and a parameter indicator (an average valve opening angle of a throttle valve) according to some embodiments of the disclosure, in which a curve 222 shows an average valve opening value when the component of the production tool processes each of the workpieces, and a curve 224 shows whether an abnormal event occurs when the component of the production tool processes each of the workpieces. As shown in FIG. 1B, no abnormal events occur before the component processes the $289^{th}$ workpiece, and thus the event indicative values of the workpieces before the $289^{th}$ workpieces may be "0", for example; and abnormal events occur after the component processes the $289^{th}$ workpiece, and thus the event indicative values after the $289^{th}$ workpieces may be "1", for example. Referring to FIG. 1C, FIG. 1C shows a relationship between an event indicative value and a parameter indicator (a frequency ×¼ feature) according to some embodiments of the disclosure, in which a curve 226 shows a frequency ×¼ feature of vibration amplitude when the component of the production tool processes each of the workpieces, and a curve 228 shows whether an abnormal event occurs when the component of the production tool processes each of the workpieces. As shown in FIG.

1C, no abnormal events occur before the component processes the 287$^{th}$ workpiece, and thus the event indicative values of the workpieces before the 287$^{th}$ workpieces may be "0", for example; and abnormal events occur after the component processes the 287$^{th}$ workpiece, and thus the event indicative values after the 287$^{th}$ workpieces may be "1", for example.

Then, conducting a correlation analysis between each of parameter indicators and the event indicative values, thereby obtaining plural correlation coefficients that are one-to-one corresponding to the parameter indicators, as listed in Table 1. Thereafter, one of the parameter indicators that is corresponding to a maximum one of the correlation coefficients is selected as an aging feature ($y_T$), such as the average valve opening that gas the largest correlation coefficient (0.7517) listed in Table 1. In addition, an auxiliary aging feature combined with the abovementioned aging feature ($y_T$) can also be selected to predict the aging feature at the next time point. Since the aging feature ($y_T$) and the auxiliary aging feature are combined into a vector, the method of the present disclosure can also be called a vector autoregression model (VAR). The auxiliary aging feature may be any other feature (e.g., a shaft deflection) except the average valve opening listed in Table 1. In some embodiments, the auxiliary aging feature can be selected manually. For example, a temperature may be selected as the auxiliary aging feature. In some embodiments, any feature selection method can be used, such as an adaptive boosting method, but the present disclosure is not limited thereto.

TABLE 1

| Algorithm | Correlation Coefficients |
| --- | --- |
| average valve opening | 0.7517 |
| frequency x¼ feature of vibration amplitude | 0.6845 |
| frequency x½ feature of vibration amplitude | −0.4148 |
| frequency x1 feature of vibration amplitude | −0.3924 |
| frequency x2 feature of vibration amplitude | 0.3534 |
| frequency x3 feature of vibration amplitude | −0.2734 |
| STD of vibration amplitude | −0.2725 |
| skewness of vibration amplitude | −0.2723 |
| Kurtosis of vibration amplitude | −0.2618 |
| RMS of vibration amplitude | 0.1767 |
| Average of vibration amplitude | 0.1454 |
| Max of vibration amplitude | 0.0012 |
| Min of vibration amplitude | 0.0012 |
| GSI of vibration amplitude | 0.0012 |

Then, a first determination operation 250 is performed to determine if the component is in a sick state according to the value of the aging feature ($y_T$) corresponding to each of the workpieces, in which one of the workpieces is set as a sample selection point once the component is in the sick state when processing the one of the workpieces. Hereinafter, an example is provided for explaining an embodiment of the first determination operation 250, but embodiments of the disclosure are not limited thereto. As shown in FIG. 1A, at first, the values of the aging feature ($y_T$) in each of the sets of process data inputted into a device health index (DHI) module 240, and are converted to plural device health indices (DHI) in accordance with a set of conversion formulas. Thereafter, an operation is performed to sequentially determine if the device health indices are greater or equal to a threshold value (e.g., 0.7) until an earliest one of the device health indices is found, wherein one of the workpieces corresponding to the earliest one of the device health indices is set as the sample selection point. The set of conversion formulas is listed as follows:

when $\bar{y}_T < y_T < UCL$, $$DHI = \bar{y}_{T\_mapping} - \left(\frac{y_T - \bar{y}_T}{UCL - \bar{y}_T} \times (\bar{y}_{T\_mapping} - UCL_{\_mapping})\right);$$

when $UCL < y_T < USL$, $$DHI = UCL_{\_mappng} - \left(\frac{y_T - UCL}{USL - UCL} \times (UCL_{\_mappng} - UCL_{\_mappng})\right);$$

when $USL < y_T < \text{Max} y_T$, $$DHI = USL_{\_mappng} - \left(\frac{y_T - USL}{\text{Max} y_T - USL} \times (USL_{\_mappng} - \text{Max} y_{T\_mappng})\right);$$

when $LCL < y_T < \bar{y}_T$, $$DHI = \bar{y}_{T\_mapping} - \left(\frac{\bar{y}_T - y_T}{\bar{y}_T - LCL} \times (\bar{y}_{T\_mapping} - LCL_{\_mappng})\right);$$

when $LSL < y_T < LCL$, $$DHI = LCL_{\_mapping} - \left(\frac{LCL - y_T}{LCL - LSL} \times (LCL_{\_mapping} - LSL_{\_mapping})\right);$$

when $\text{Min} y_T < y_T < LSL$, $$DHI = LSL_{\_mapping} - \left(\frac{LSL - y_T}{LSL - \text{Min} y_T} \times (\text{Min} y_{T\_mapping} - LSL_{\_mapping})\right);$$

where $y_T$ represents the aging feature, $\bar{y}_T$ represents a mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $y_{T\_mapping}$ is a conversion value corresponding to Min $y_T$;

LSL is a lower specification limit; LCL is a lower control limit; USL is an upper specification limit; UCL is an upper control limit; LSL$_{mapping}$ is a conversion value corresponding to the LSL; LCL$_{mapping}$ is a conversion value corresponding to the LCL; USL$_{mapping}$ is a conversion value corresponding to the USL; and UCL$_{mapping}$ is a conversion value corresponding to the UCL. The DHI algorithm is similar to those disclosed in U.S. Pat. No. 10,242,319 B2. U.S. Pat. No. 10,242,319 B2 is hereby incorporated by reference.

Figure 3A:
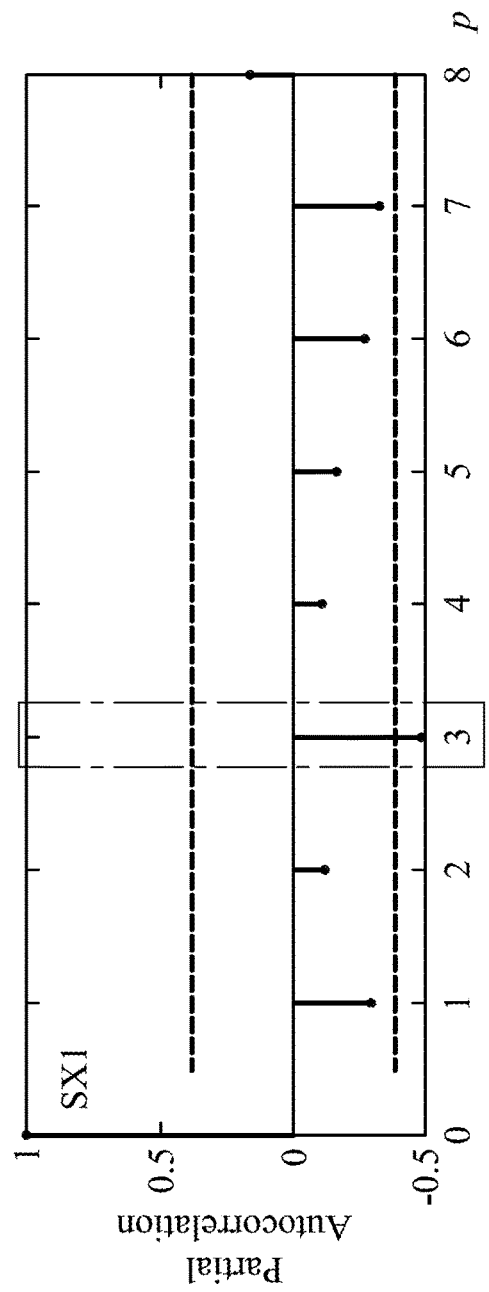
FIG. 3A shows a schematic view of a partial autocorrelation function of an aging feature according to one embodiment of the disclosure.
Figure 3B:
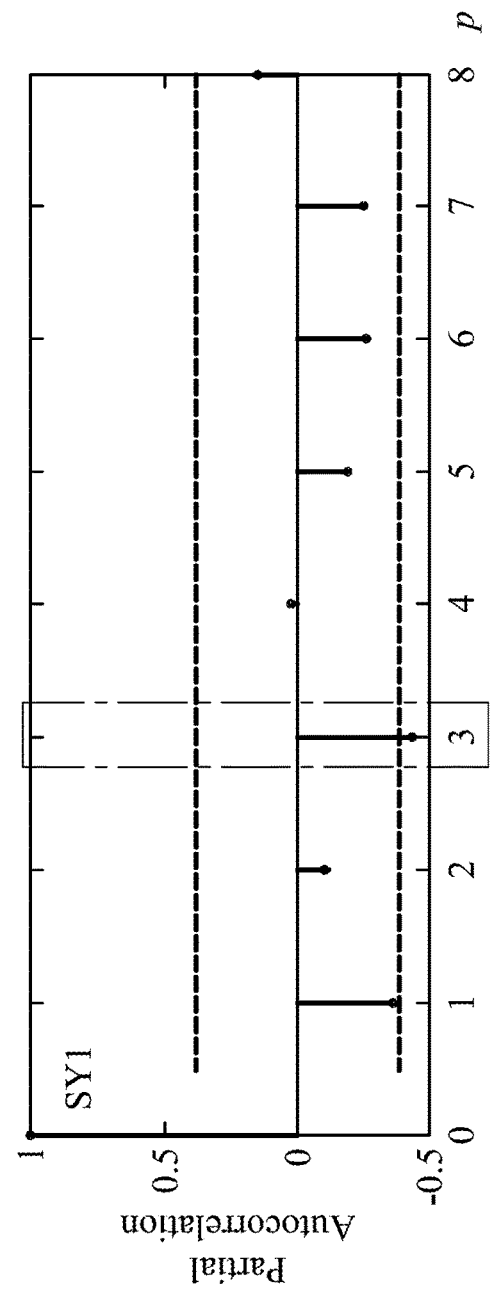
FIG. 3B shows a schematic view of a partial autocorrelation function of an auxiliary aging feature according to one embodiment of the disclosure.

Then, a multiple-variable model-building operation 260 is performed. In the multiple-variable model-building operation 260, at first, N values of the aging feature ($y_T$) and N values of the auxiliary aging feature are used as a set of model-building sample data. The N values of the aging feature ($y_T$) are corresponding to N sets of the sets of process data belonging to successive N of the workpieces that are processed directly before the sample selection point, where N is a positive integer. Thereafter, a Granger causality test is performed on the aging feature ($y_T$) and the auxiliary aging feature to determine a correlation between the aging feature ($y_T$) and the auxiliary aging feature. If there is no correlation between the aging feature ($y_T$) and the auxiliary aging feature, the auxiliary aging feature is deleted from the set of model-building sample data. For example, assuming that the number of the aging feature is one (e.g., SX1), and the number of the auxiliary aging feature selected is two (e.g., SY1 and SZ1), if the auxiliary aging feature SY1 is related to the aging feature ($y_T$), the auxiliary aging feature SY1 is retained; if the auxiliary aging feature SZ1 is not related to the aging feature ($y_T$), the auxiliary aging feature SZ1 is deleted, so that the set of model-building sample data corresponds to the aging feature SX1 and the auxiliary aging feature SY1 (as shown in FIGS. 3A and 3B). In one embodiment, each of the aging feature SX1 and the auxiliary aging features SY1 and SZ1 may be a shaft deflection, and the shaft deflection represents an angle by which a shaft of a workpiece (e.g., a bearing) deviates. The aging feature SX1 represents the angle by which the shaft of the workpiece deviates from the X plane. The auxiliary aging feature SY1 represents the angle by which the shaft of the workpiece deviates from the Y plane. The auxiliary aging feature SZ1 represents the angle by which the shaft of the workpiece deviates from the Z plane, but the present disclosure is not limited thereto. Thereafter, an aging-feature prediction model is built by using the set of model-building sample data in accordance a multiple-variable time series prediction algorithm, thereby obtaining plural predicted values of the aging feature ($y_T$) that are arranged in a processing order. Then, a process time of each of the workpieces and a dead spec are used to perform a conversion operation for converting the predicted values of the aging feature ($y_T$) to plural predicted remaining useful life values ($RUL_t$), in which the dead spec is a value of the aging feature ($y_T$) used or generated by the component when the component cannot work; and t stands for the $t^{th}$ workpieces and t is an integer. It is noted that the conventional time series prediction technique uses only single variable to make predictions, so the prediction accuracy is limited. However, the multiple-variable time series prediction algorithm and the multiple-variable model-building operation 260 of the present disclosure expand the limitation that only single variable is used, so that the predicted aging feature depends on not only the past aging feature, but also other feature (e.g., an auxiliary aging feature), thereby improving the prediction accuracy by using multiple variables. The multiple-variable time series prediction algorithm and the multiple-variable model-building operation 260 will be described in detail later. In the conversion operation, at first, plural time points at which the component of the production tool processes the workpieces respectively are obtained in accordance with the process times used by the component of the production tool for processing the workpieces respectively. Thereafter, an operation is performed to sequentially determine if the predicted values are substantially equal to the dead spec until an earliest one of the predicted values is found, and one of the time points corresponding to the earliest one of the predicted values is a death time point at which the component cannot work. Then, an operation is performed to compute differences between the death time point and the respective time points at which the workpieces are processed, thereby obtaining the predicted remaining useful life values ($RUL_t$).

Thereafter, a second determination operation is performed to determine if the component of the production tool needs replacement or maintenance in accordance with the predicted remaining useful life values ($RUL_t$). In some embodiments, the second determination operation includes a pre-alarm mode 270 and a DCI model 280. The pre-alarm mode 270 and a DCI model 280 will be described later.

Figure 2A:
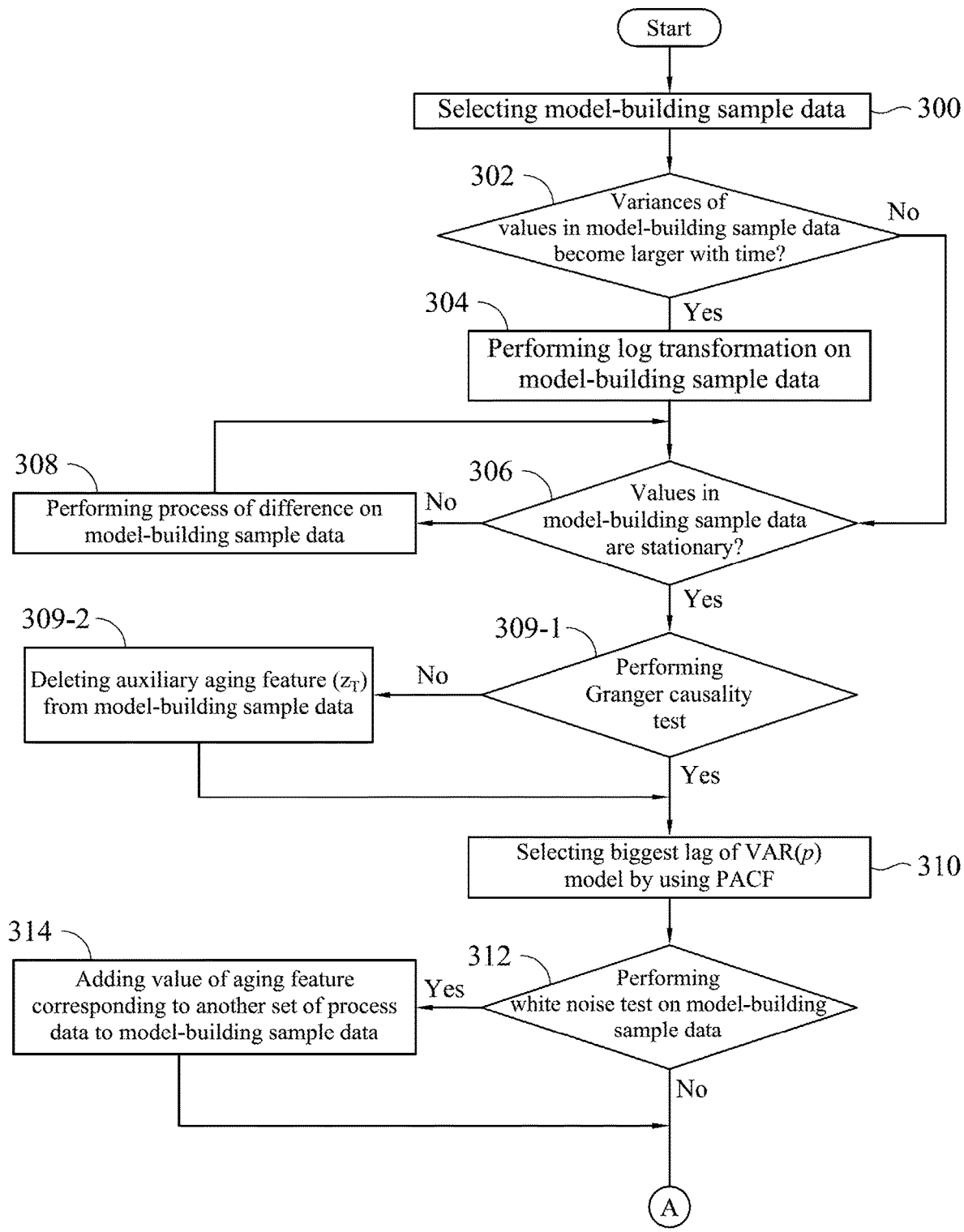
FIG. 2A and FIG. 2B are a flow chart showing a multiple-variable model-building operation according to some embodiments of the disclosure.
Figure 2B:
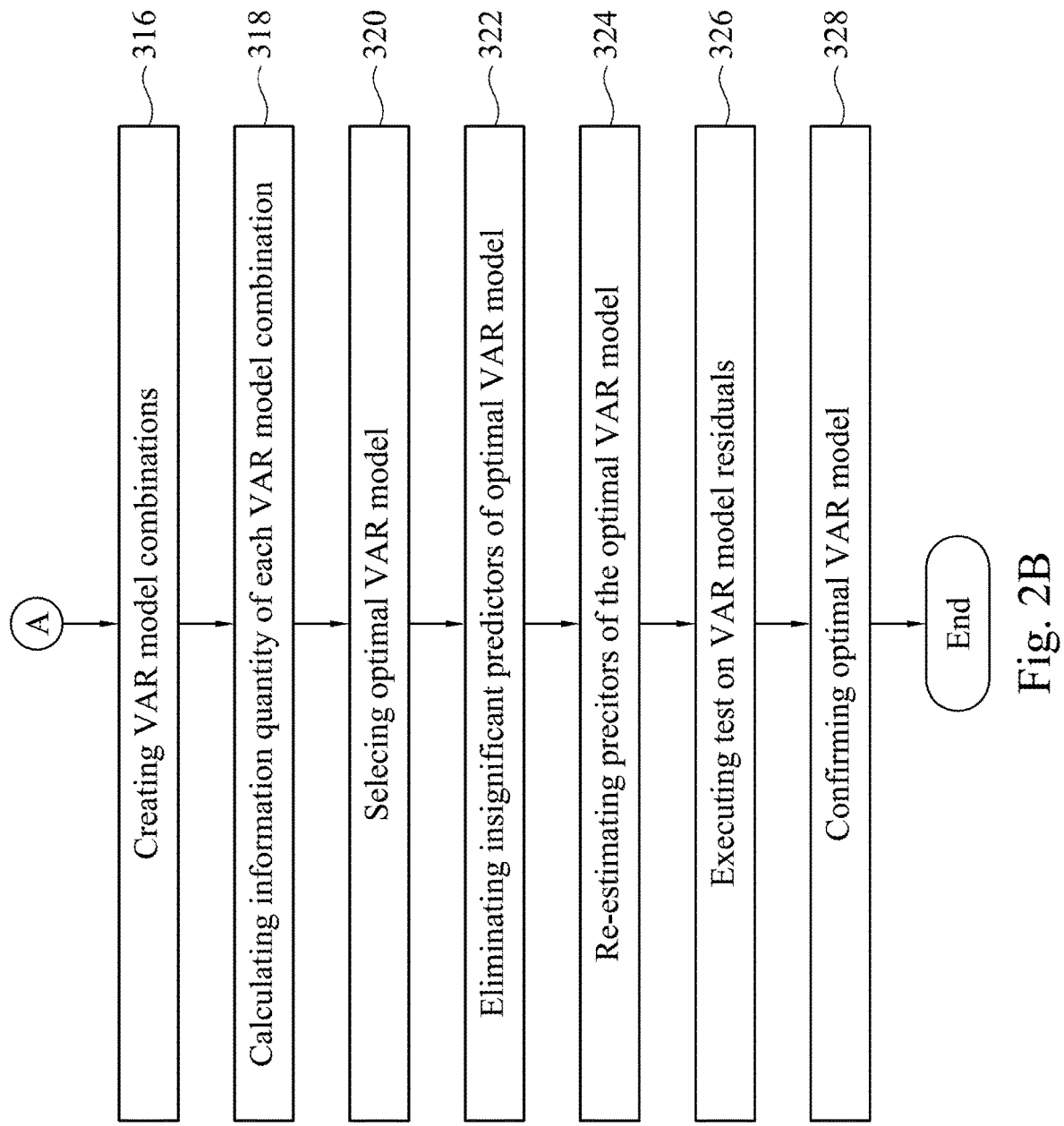

Referring to FIG. 2A and FIG. 2B, FIG. 2A and FIG. 2B are a flow chart showing a multiple-variable model-building operation 260 according to some embodiments of the disclosure. At first, step 300 is performed to select a value of the aging feature (actual aging feature value) in each of N sets of the process data corresponding to N workpieces processed by the component of the production tool before the aforementioned sample selection point (t) (i.e., the first workpiece with the DHI is greater than 0.7) and N values of the auxiliary aging feature as a set of model-building sample data ($Y_M$), where N is a positive integer, such as 30, i.e., 30 workpieces before the workpiece with DHI greater than 0.7. The aging feature of the set of model-building sample data represents as $Y_M=\{y_{t-30}, y_{t-29}, \ldots, y_{t-2}, y_{t-1}\}$, and the auxiliary aging feature represents as $Z_M=\{z_{t-30}, z_{t-29}, \ldots, z_{t-2}, z_{t-1}\}$.

Thereafter, step 302 is performed to determine the variances of the values of the aging feature in the set of model-building sample data become larger with time (time points processing the workpieces). In other words, if $y_t=(1+\alpha) \times y_{t-1}$, in which $\alpha$ is greater than 0, meaning that $y_t$ increases over time and $Var(y_t)$ grows along with $\alpha$, then step 304 is performed; else step 306 is performed. In step 304, Log transformation is performed on each value in the set of model-building sample data, thereby forcing the increase rate distribution of data to possess certain regularity, and then step 306 is performed.

In step 306, a unit root test is performed on the values in the set of model-building sample data, thereby checking whether the values in the set of model-building sample data are stationary or not. When the values in the set of model-building sample data are not stationary, a process of difference (difference operator) is performed on each value in the set of model-building sample data (step 308), such that non-stationary series can be converted into stationary ones through the process of difference. The unit root test may be an augmented Dickey-Fuller test (ADF test) or a Kwiatkowski-Phillips-Schmidt-Shin (KPSS) test.

When the values arranged in series are not stationary (the result of step 306 is false ("no")), step 308 is performed, and the process of difference is performed on each value in the set of model-building sample data, so that the values arranged in series (time series) reach a steady state. The process of difference is formulated as $\nabla^d y_{t-i}=y_{t-i}-y_{t-i-1}$, $\nabla^d z_{t-i}=z_{t-i}-z_{t-i-1}$. When the values arranged in series are stationary (the result of step 306 is true ("yes")), step 309-1 is performed, and a Granger causality test is performed on the aging feature ($y_T$) and the auxiliary aging feature ($z_T$) to determine a correlation between the aging feature ($y_T$) and the auxiliary aging feature ($z_T$). If there is no correlation between the aging feature ($y_T$) and the auxiliary aging feature ($z_T$), step 309-2 is performed to delete the auxiliary aging feature ($z_T$) from the set of model-building sample data. If there is correlation between the aging feature ($y_T$) and the auxiliary aging feature ($z_T$), the auxiliary aging feature ($z_T$) is retained. The Granger causality test is well known to those who are skilled in the art, and are not described in detail herein.

Then, step 310 is performed to select the biggest lag p of the VAR model (VAR(p)) by using a partial autocorrelation function (PACF), and the formulas are listed as follows:

$$B = \arg\max(\rho\rho_k). \tag{1}$$

$$\rho_k = \frac{\text{cov}(y_t, y_{t-k})}{\sqrt{\text{Var}(y_t)}\sqrt{\text{Var}(y_{t-k})}} = \frac{\gamma_k}{\gamma_0} \tag{2}$$

$$\gamma_k = \text{cov}(y_t, y_{t-k}) = E(y_t - \mu)(y_{t-k} - \mu) \tag{3-1}$$

$$\rho\rho_k = \text{Corr}(Y_t, Y_{t-k} \mid y_{t-1}, y_{t-2}, \ldots, y_{t-k+1}) \tag{3-2}$$

where B is the most $y_{t-1}$-related PACF time (workpiece number); $\text{Var}(y_t)=\text{Var}(y_{t+k})=E(y_t-\mu)^2=\gamma_0$.; $E[\bullet]$ is the expected value; $\mu$ is the mean of $y_t$. For example, Referring to FIG. 3A and FIG. 3B, FIG. 3A shows a schematic view of a partial autocorrelation function of an aging feature SX1 according to one embodiment of the disclosure; and FIG. 3B shows a schematic view of a partial autocorrelation function of an auxiliary aging feature SY1 according to one embodiment of the disclosure. The aging feature SX1 and the auxiliary aging feature SY1 are the shaft deflections. In FIG. 3A and FIG. 3B, the biggest lag p of the VAR model (VAR(p)) selected by using the PACF on the aging feature SX1 is 3. The biggest lag p of the VAR model (VAR(p)) selected by using the PACF on the auxiliary aging feature SY1 is 3. Therefore, the present disclosure can determine the biggest lag p of VAR(p) via the PACF.

Thereafter, step 312 is performed to perform a white noise test on the respective values (the values of the aging feature and the values of the auxiliary aging feature) in the set of model-building sample data, in which the white noise test may be a Ljung-Box test. Step 312 is mainly to check if the time series data is white noise, i.e., autocorrelation between any two values in the set of sample data is 0 meaning that the two values are irrelevant. If any value in the set of model-building sample data is white noise, a value of the aging feature (actual aging feature value, i.e., $y_{t-(N+1)}$ or $y_{t-31}$) corresponding to another set of the sets of process data belonging to the N+1$^{th}$ workpiece that is processed before the sample selection point and a value of the auxiliary aging feature (actual auxiliary aging feature value, i.e., $z_{t-(N+1)}$ or $z_{t-31}$) are added to the set of model-building sample data (step 314).

Then, step 316 is performed to create plural VAR(p) model combinations and determine the number of the VAR(p) model combinations according to the biggest lag p of the VAR(p) model. For example, when the biggest lag p of the aforementioned VAR(p) model is 3, three VAR(p) model combinations are created: VAR(1), VAR(2) and VAR(3). VAR(1), VAR(2) and VAR(3) are VAR(p) where p is equal to 1, 2 and 3, respectively. Hereinafter, the VAR(p) model are described.

The VAR(p) model is defined as:

$$\hat{y}_t = b + \sum_{i=1}^{P}(\varphi_i y_{t-i} + \beta_i z_{t-i}) + \varepsilon_t \quad (4)$$

where $\hat{y}_t$ is a predicted value of the aging feature at a time point t (the $t^{th}$ workpiece); b is a constant vector; $\varphi_i$ is the least square estimated coefficient of the VAR(p) model at the time point t (the $t^{th}$ workpiece), i=1, 2, . . . , p; $y_{t-i}$ is an actual value of the aging feature at a time point (t–i) (the (t–i)$^{th}$ workpiece), and the actual value of the aging feature is corresponding to the aging feature SX1 of FIG. 3A; $z_{t-i}$ is an actual value of the auxiliary aging feature at the time point (t–i) (the (t–i)$^{th}$ workpiece), and the actual value of the auxiliary aging feature is corresponding to the auxiliary aging feature SY1 of FIG. 3B; $\beta_i$ is a coefficient to be trained (searched for); $\varepsilon_t$ is a white noise term at the time point t (the $t^{th}$ workpiece), i.e., an error vector. If the auxiliary aging feature is deleted in step 309-2, the coefficients $\beta_i$ in equation (4) are all set to 0.

Then, step 318 is performed to calculate an information quantity of each of the VAR(p) model combinations by using an information criterion algorithm, in which the information criterion algorithm is a Bayesian information criterion (BIC). In statistics, BIC is a criterion for model selection among a finite set of models; thus, the model with the lowest BIC is preferred. The BIC algorithm is expressed as:

$$BIC(p) = \log\left(\frac{SSE(p)}{M}\right) + (p+1)\frac{\log(M)}{M} \quad (5)$$

-continued
$$SSE(p) = \sum_{i=1}^{M}(y_i - \hat{y}_t)^2 \quad (6)$$

where SSE is sum of squared errors; and M is the size of the set of model-building sample data.

Table 2 is an example of the information quantity of each of the VAR(p) model combinations VAR(1), VAR(2), VAR(3) calculated by using the BIC algorithm.

TABLE 2

| p | 1 | 2 | 3 |
|---|---|---|---|
| BIC | −106.7993 | −97.3780 | −90.0793 |

Thereafter, step 320 is performed to select one of the VAR(p) model combinations that has the biggest information quantity (i.e., the smallest BIC) as an optimal model, for example, VAR(1).

Then, step 322 is performed to eliminate the insignificant predictors (parameters) of the optimal VAR(p) model. When an estimated coefficient of a predictor is over 95% confidence interval, the predicator is an insignificant predictor. With assumption of normal distribution, 95% confidence interval equals to 1.96, which means that the predictor cannot be utilized to explain the future spans, and thus will be deleted. The determination formulas for the insignificant predictors (parameters) of the optimal model are listed as follows:

$$|\varphi_i| > 1.96 \times s.e.(\varphi_i) \quad (7)$$

$$|\beta_i| > 1.96 \times s.e.(\beta_i) \quad (8)$$

where i=1, 2, . . . , p; and s.e.(.) is a standard deviation of the coefficients.

Thereafter, step 324 is performed to re-estimate the coefficients of the predictors of the optimal VAR(p) model after removing the insignificant predictors.

Then, step 326 is performed to execute a test on the (VAR(p)) model residuals, and the test may be a Ljung-Box test, etc., for example. When the model residuals are explanatory, the re-estimated model is confirmed as the optimal VAR(p) model (step 328), and is used to obtain plural predicted values of the aging feature ($y_T$) that are arranged in a processing order of the workpieces. Thereafter, step 330 is performed to use a process time (dt) and a dead spec to convert the predicted values of the aging feature to predicted remaining useful life values ($RUL_t$), in which the process time (dt) is a period of time used by the component of the production tool for processing each of the workpieces, and the dead spec is a value of the aging feature ($y_T$) used or generated by the component of the production tool when the component of the production tool cannot work. The conversion is formula is $RUL_t = k_D - k_t$, where t represents the $t^{th}$ workpiece and is an integer; $k_t$ represents the $t^{th}$ workpiece; $k_D$ represents the time point of the earliest one of the predicted values corresponding to the dead spec.

After the predicted remaining useful life values ($RUL_t$) are obtained, a second determination operation is performed to determine if the component of the production tool needs replacement or maintenance in accordance with the predicted values of the aging feature or the predicted remaining useful life values ($RUL_t$). As shown in FIG. 1A, in some embodiments, the second determination operation includes the pre-alarm mode 270 and the DCI mode 280.

Figure 4:
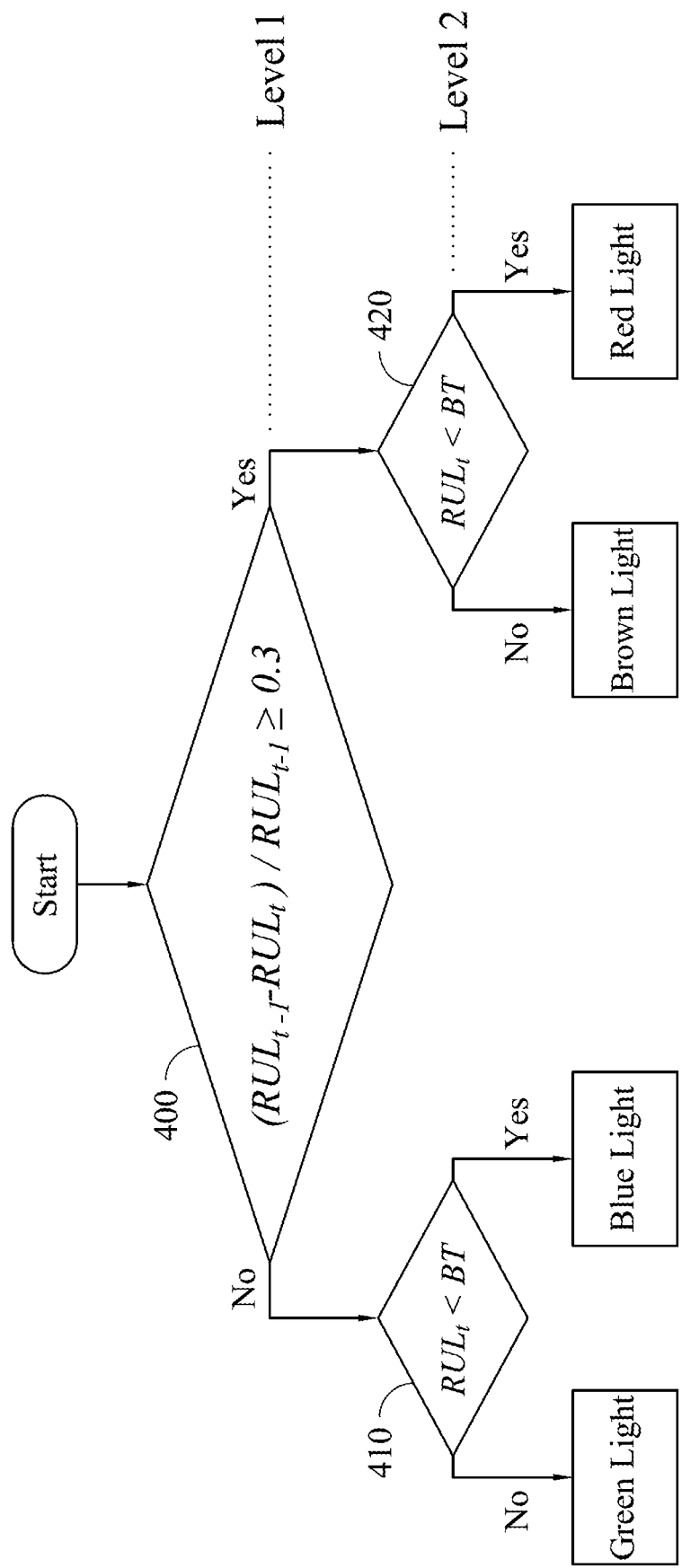
FIG. 4 is schematic block diagram for explaining a pre-alarm mode according to some embodiments of the disclosure.

Hereinafter, the pre-alarm mode 270 is explained. When the predicted remaining useful life values ($RUL_t$) decline dramatically or oscillates near the dead state, it is difficult for a used to determine if the component of the production tool needs replacement or maintenance. Thus, the pre-alarm mode 270 is provided to solve the problem. Referring to FIG. 4, FIG. 4 is schematic block diagram for explaining a pre-alarm mode according to some embodiments of the disclosure. At first, at level 1, step 400 is performed to determine if the decline rate of the current $RUL_t$ compared to the previous $RUL_{t-1}$ is greater than or equal to a threshold (for example, 30%), i.e., if $(RUL_{t-1}-RUL_t)/RUL_{t-1} \geq 0.3$ is met. When the result of step is true ("yes"), step 410 or 420 at level 2 is performed to determine if $RUL_t$ is smaller than a maintenance buffer time (BT), thereby obtaining a second result, in which the maintenance buffer time (BT) is provided by a manufacturer of the component of the production tool, and the component of the production tool has to be maintained or replaced within the maintenance buffer time (BT) when being abnormal. When the first result and the second result both are false ("no"), the component of the production tool is in a sick state but does not deteriorate drastically, and no maintenance is needed, such that a green light is shown, for example. When the first result is false ("no") and the second result is true ("yes"), the component of the production tool does not deteriorate drastically but its remaining useful life is sufficient, and maintenance is needed, such that a blue light is shown, for example. When the first result is true ("yes") and the second result is false ("no"), the component of the production tool deteriorates drastically, such that a brown light is shown, for example. If the first result for each of the $t^{th}$ workpiece to the $(t+i)^{th}$ workpiece that are successively processed by the component of the production tool is true ("yes") and its corresponding second result is false ("no"), i.e., those i workpieces show brown light, then inspection or maintenance is needed, where i is a positive integer. When the first result and the second result both are true ("yes"), the component of the production tool needs maintenance, such that a red light is shown, for example.

Hereinafter, the DCI mode 280 is explained. To handle the case in the pre-alarm mode 270 in which the blue light is shown presently but the component of the production tool suddenly dies (does not work) at a time point when processing a next workpiece, the DCI mode 280 is provided. The DCI is used to estimate the correlation between $y_{death}$ and $y_{t-1}$, in which $y_{death}$ is the predicted value of the aging feature corresponding to a time point when the component of the production tool is at a dead state, and $y_{t-1}$ is the predicted value of the aging feature corresponding to the $(t-1)^{th}$ workpiece processed by the component of the production tool. The DCI is defined from 0 to 1, and the higher value of the DCI indicates the sicker of the component of the production tool. When the value of DCI is higher than its threshold ($DCI_T$), under 95% confidence level, there is a positive correlation between the current status of the component of production tool and its predicted RUL, which means that the component of the production tool is closer to the dead state, and it requires immediate maintenance. On the contrary, when the calculated DCI is closer to 0, it means the current status of the component of the production tool is irrelevant with its predicted RUL. In other words, even if the component of the production tool is sick, it is not in danger of entering the dead state. According to PACF as in equation (2), DCI can be calculated as:

$$DCI_t = \frac{conv(y_{death}, y_{t-1})}{Var(y_{death})} \quad (9)$$

The threshold ($DCI_T$) is defined as $$DCI_T = 1.96 \times s.e.(DCI) \quad (10)$$

where s.e.(DCI) is a standard error of the DCI, cony is a covariance computation, and Var is a variance computation.

Figure 5:
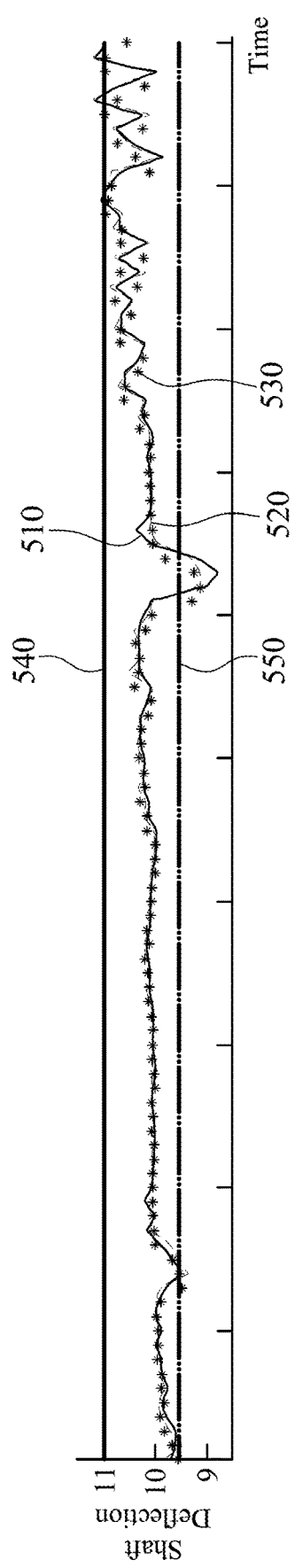
FIG. 5 is a prediction result of a shaft deflection of the component.
Figure 6:
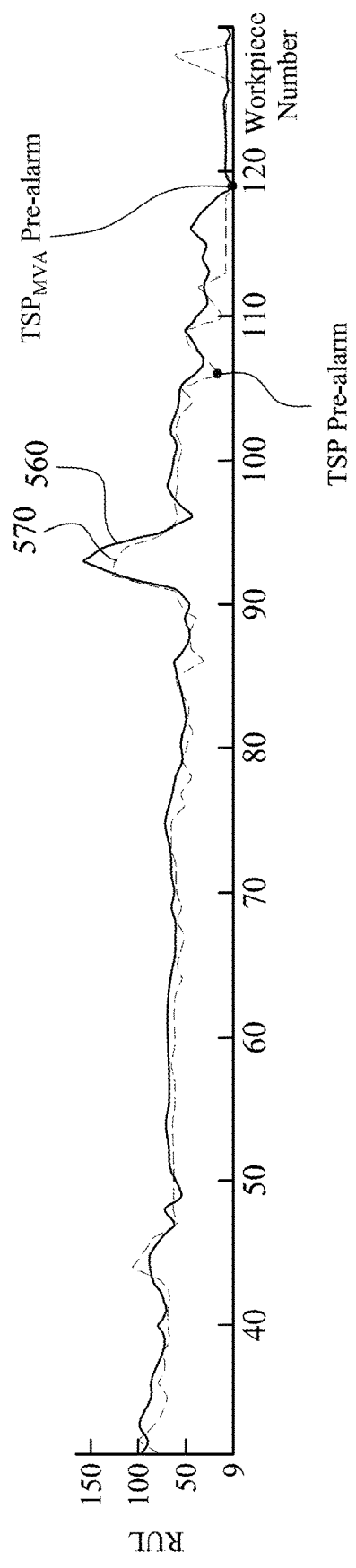
FIG. 6 is a prediction result of a RUL of the component.
Figure 7:
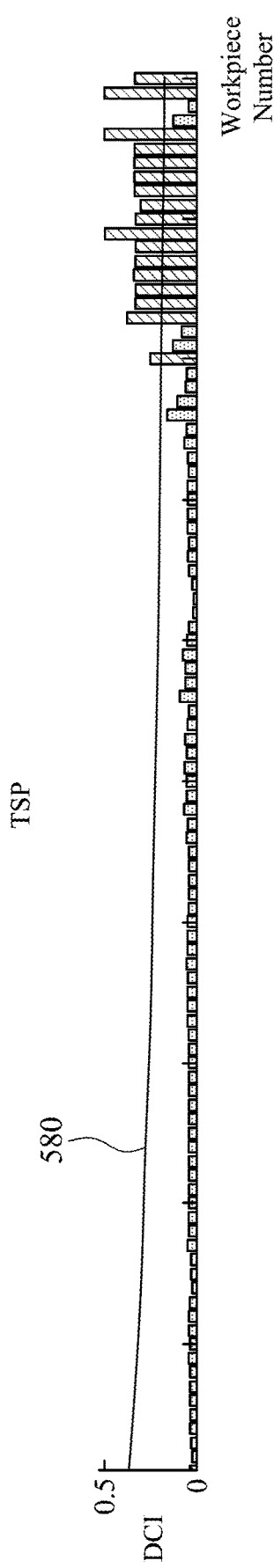
FIG. 7 is a prediction result of a DCI (TSP) of the component.
Figure 8:
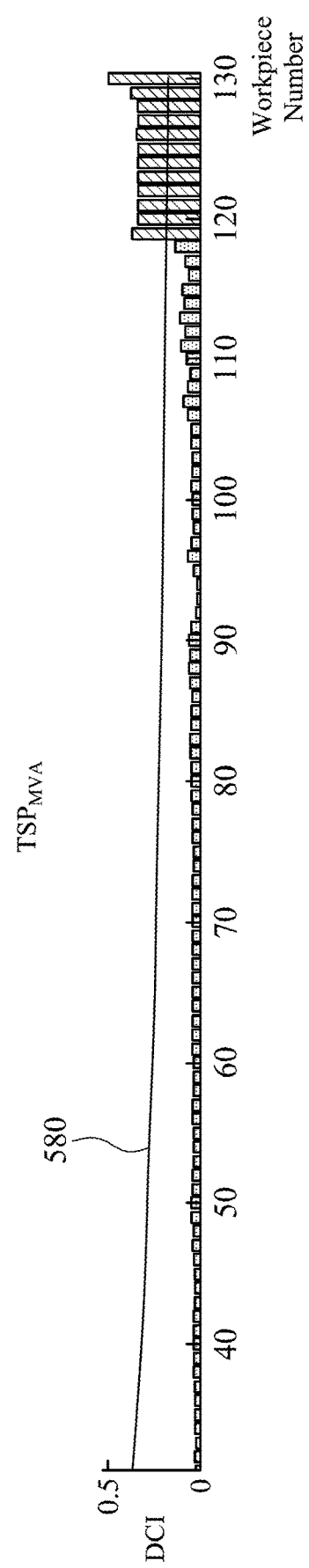
FIG. 8 is a prediction result of another DCI ($TSP_{MVA}$) of the component.

Hereinafter, a shaft deflection (the aging feature SX1 and the auxiliary aging feature SY1) of the component, its RUL prediction results and its DCI prediction results are used to explain the embodiments of the disclosure. The shaft deflection represents an angle by which a shaft of the component deviates. The aging feature SX1 represents the angle by which the shaft of the component deviates from the X plane. The auxiliary aging feature SY1 represents the angle by which the shaft of the component deviates from the Y plane. The auxiliary aging feature SY1 is based on the result of the Granger causality test in the multiple-variable model-building operation 260. Referring to FIG. 5, FIG. 6, FIG. 7 and FIG. 8, FIG. 5 is a prediction result of a shaft deflection of the component; FIG. 6 is a prediction result of a RUL of the component; FIG. 7 is a prediction result of a DCI (TSP) of the component; and FIG. 8 is a prediction result of another DCI ($TSP_{MVA}$) of the component. TSP represents a conventional single-variable time series prediction algorithm (considering only single aging feature). $TSP_{MVA}$ represents the multiple-variable time series prediction algorithm of the present disclosure (considering multiple aging features). In FIG. 5, the horizontal axis is time, and the vertical axis is the shaft deflection. A curve 510 shows the predicted values of the shaft deflection of the component obtained by using $TSP_{MVA}$; a curve 520 shows the predicted values of the shaft deflection of the component obtained by using TSP; a point group 530 (composed of "*" signs) is the actual values; a straight line 540 shows a dead spec of the shaft deflection of the component; and a straight line 550 shows a sick spec of the shaft deflection of the component. In FIG. 6, the horizontal axis is a workpiece number, and the vertical axis is the RUL. A curve 560 and a curve 570 show predicted values of the RUL obtained by using TSP and $TSP_{MVA}$, respectively. The curve 560 has a pre-alarm at the $106^{th}$ workpiece, and the curve 570 has a pre-alarm at the $119^{th}$ workpiece. In FIGS. 7 and 8, a straight line 580 is a DCI threshold (DCIT). When the DCI is smaller than the DCI threshold, no maintenance is needed; and when the DCI is greater than or equal to the DCI threshold, it means that the component is near a dead state when processing the workpiece, and maintenance is needed. FIG. 7 is the DCI calculated by using TSP, and FIG. 8 is the DCI calculated by using $TSP_{MVA}$. TSP issues a pre-alarm for 24 days before the death time, and $TSP_{MVA}$ issues a pre-alarm for only 11 days before the death time. Comparing TSP with $TSP_{MVA}$, it is obvious that TSP (the conventional technique) issues a premature pre-alarm, so that the RUL evaluated by using $TSP_{MVA}$ (the present disclosure) is more accurate.

It is understood that the multiple-variable predictive maintenance method for the component of the production tool of the present disclosure is performed by the aforementioned steps. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, in or on the workpieces (such as wafers, glass substrates). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

It can be known from the above that, the application of the embodiments of the present invention can utilize the aging feature and the auxiliary aging feature to predict another aging feature, and this means predicting one variable by using multiple variables. The conventional TSP technique uses only single variable to make predictions, so the prediction accuracy is limited. On the contrary, the multiple-variable time series prediction of the present disclosure expands the limitation that only single variable is used, so that the predicted aging feature depends on not only the past aging feature, but also other feature (e.g., the auxiliary aging feature), thereby improving the prediction accuracy by using multiple variables. The embodiments of the present invention can also accurately predict the RUL of the component of the production tool in real time, so as to perform maintenance on the component of the production tool in time; and can perform maintenance immediately when the component is very likely to enter a dead state, and can quantitatively show the possibility of the component entering the dead state.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multiple-variable predictive maintenance method, comprising:
   obtaining a plurality of sets of process data used or generated by a component of a production tool when a plurality of workpieces are processed in sequence, wherein each of the sets of process data comprises values of a plurality of parameters, the values of each of the parameters in each of the sets of process data is a set of time series data values within a period of processing time when the component of the production tool is processing one of the workpieces, and the sets of process data are one-to-one corresponding to the sets of workpieces;
   according to if an abnormal event occurs when the component is processing each of the workpieces, obtaining a plurality of event indicative values that are one-to-one corresponding to the sets of process data;
   converting the set of time series data values of each of the parameters in each of the sets of process data to a value of a parameter indicator by using a plurality of algorithms respectively, wherein the parameter indicators are one-to-one corresponding to the parameters;
   conducting a correlation analysis between each of parameter indicators and the event indicative values, thereby obtaining a plurality of correlation coefficients one-to-one corresponding to the parameter indicators;
   selecting one of the parameter indicators that is corresponding to a maximum one of the correlation coefficients as an aging feature, and setting an auxiliary aging feature, wherein the auxiliary aging feature is another of the parameter indicators and is not corresponding to the maximum one of the correlation coefficients;
   performing a first determination operation to determine if one of the workpieces is set as a sample selection point according to the value of the aging feature corresponding to each of the workpieces when processing the one of the workpieces;
   performing a multiple-variable model-building operation, wherein the multiple-variable model-building operation comprises:
      using N values of the aging feature and N values of the auxiliary aging feature as a set of model-building sample data, wherein the N values of the aging feature are corresponding to N sets of the sets of process data belonging to successive N of the workpieces that are processed directly before the sample selection point, wherein N is a positive integer;
      performing a Granger causality test on the aging feature and the auxiliary aging feature to determine a correlation between the aging feature and the auxiliary aging feature, wherein if there is no correlation between the aging feature and the auxiliary aging feature, deleting the auxiliary aging feature from the set of model-building sample data;
      building an aging-feature prediction model by using the set of model-building sample data in accordance a multiple-variable time series prediction algorithm, thereby obtaining a plurality of predicted values of the aging feature that are arranged in a processing order;
      obtaining a plurality of time points at which the component processes the workpieces respectively in accordance with a plurality of process times used by the component for processing the workpieces respectively;
      obtaining a dead spec that is a value of the aging feature used or generated by the component when the component cannot work; and
      sequentially determining if the predicted values are substantially equal to the dead spec until an earliest one of the predicted values is found, wherein one of the time points corresponding to the earliest one is a death time point at which the component cannot work.

2. The multiple-variable predictive maintenance method as claimed in claim 1, wherein the first determination operation comprises:

converting the values of the aging feature in each of the sets of process data to a plurality of device health indices (DHI) in accordance with a set of conversion formulas as follows:

when $\bar{y}_T < y_T < UCL$, $$DHI = \bar{y}_{T\_mapping} - \left(\frac{y_T - \bar{y}_T}{UCL - \bar{y}_T} \times \left(\bar{y}_{T\_mapping} - UCL_{\_mapping}\right)\right);$$

when $UCL < y_T < USL$, $$DHI = UCL_{\_mapping} - \left(\frac{y_T - UCL}{USL - UCL} \times \left(UCL_{\_mapping} - USL_{\_mapping}\right)\right);$$

when $USL < y_T < \text{Max } y_T$, $$DHI = USL_{\_mapping} - \left(\frac{y_T - USL}{\text{Max } y_T - USL} \times \left(USL_{\_mapping} - \text{Max } y_{T\_mapping}\right)\right);$$

when $LCL < y_T < \bar{y}_T$, $$DHI = \bar{y}_{T\_mapping} - \left(\frac{\bar{y}_T - y_T}{\bar{y}_T - LCL} \times \left(\bar{y}_{T\_mapping} - LCL_{\_mapping}\right)\right);$$

when $LSL < y_T < LCL$, $$DHI = LCL_{\_mapping} - \left(\frac{LCL - y_T}{LCL - LSL} \times \left(LCL_{\_mapping} - LSL_{\_mapping}\right)\right);$$

when $\text{Min } y_T < y_T < LSL$, $$DHI = LSL_{\_mapping} - \left(\frac{LSL - y_T}{LSL - \text{Min } y_T} \times \left(\text{Min } y_{T\_mapping} - LSL_{\_mapping}\right)\right);$$

wherein $y_T$ represents the aging feature, $\bar{y}_T$ represents a mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{\_mapping}$ is a conversion value corresponding to the USL; and $UCL_{\_mapping}$ is a conversion value corresponding to the UCL; and sequentially determining if the device health indices are greater or equal to a threshold value until an earliest one of the device health indices is found, wherein one of the workpieces corresponding to the earliest one of the device health indices is set as the sample selection point.

3. The multiple-variable predictive maintenance method as claimed in claim 1, wherein the multiple-variable model-building operation further comprises:

building the aging-feature prediction model by using a vector autoregression (VAR) model as the multiple-variable time series prediction algorithm;

selecting the biggest lag of the VAR model by using a partial autocorrelation function (PACF);

performing a white noise test on the values of the aging feature in the set of model-building sample data, wherein when one of the values of the aging feature in the set of model-building sample data is a white noise, a value of the aging feature corresponding to another set of process data belonging to a (N+1)$^{th}$ workpiece processed before the sample selection point is added to the set of model-building sample data;

creating a plurality of VAR model combinations by using the biggest lag of the VAR model;

calculating an information quantity of each of the VAR model combinations by using an information criterion algorithm; and selecting one of the VAR model combinations that has the biggest information quantity as an optimal model.

4. The multiple-variable predictive maintenance method as claimed in claim 3, wherein the information criterion algorithm is a Bayesian information criterion (BIC).

5. The multiple-variable predictive maintenance method as claimed in claim 1, wherein the multiple-variable model-building operation further comprises:

determining if variances of the values of the aging feature in the set of model-building sample data become larger with time, and performing a log transformation on each of the values of the aging feature in the set of model-building sample data when the variances of the values of the aging feature in the set of model-building sample data become larger with time; and performing a unit root test on the values of the aging feature in the set of model-building sample data to check if the values of the aging feature in the set of model-building sample data arranged in sequence is stationary, and performing a process of difference on each of the values of the aging feature in the set of model-building sample data when the values of the aging feature in the set of model-building sample data is not stationary.

6. The multiple-variable predictive maintenance method as claimed in claim 5, wherein the unit root test is an augmented Dickey-Fuller test (ADF test) or a Kwiatkowski-Phillips-Schmidt-Shin (KPSS) test.

7. The multiple-variable predictive maintenance method as claimed in claim 1, further comprising performing a second determination operation to determine if the component of the production tool needs replacement or maintenance, wherein the second determination operation comprises:

converting the predicted values of the aging feature to a plurality of death correlation indices (DCI) in accordance with a set of conversion formulas as follows:

$$DCI_t = \frac{conv(y_{death}, y_{t-1})}{\text{Var}(y_{death})},$$

wherein $y_{death}$ is the predicted value of the aging feature when the component cannot work, $y_{t-1}$ is the value of the aging feature corresponding to a (t−1)$^{th}$ workpiece processed by the component, conv is a covariance computation, and Var is a variance computation; and when $DCI_t$ is greater than a threshold, it means that the component is near a dead state when processing a $t^{th}$ workpiece, wherein the threshold is based on a standard error of $DCI_t$, and t is an integer.

8. The multiple-variable predictive maintenance method as claimed in claim 1, wherein the component comprises a heater, a pressure module, a throttle valve, an oilless bushing or a bearing, and the parameters comprise a shaft deflection, a valve opening angle, a vibration amplitude, a driving voltage, a driving current, a temperature and/or a pressure.

9. The multiple-variable predictive maintenance method as claimed in claim 1, wherein the parameter indicators comprise a k-times frequency feature (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value.

10. A non-transitory tangible computer readable recording medium storing instructions which when executed by a processor configured to perform a multiple-variable predictive maintenance method, the multiple-variable predictive maintenance method comprising:
   obtaining a plurality of sets of process data used or generated by a component of a production tool when a plurality of workpieces are processed in sequence, wherein each of the sets of process data comprises values of a plurality of parameters, the values of each of the parameters in each of the sets of process data is a set of time series data values within a period of processing time when the component of the production tool is processing one of the workpieces, and the sets of process data are one-to-one corresponding to the sets of workpieces;
   according to if an abnormal event occurs when the component is processing each of the workpieces, obtaining a plurality of event indicative values that are one-to-one corresponding to the sets of process data;
   converting the set of time series data values of each of the parameters in each of the sets of process data to a value of a parameter indicator by using a plurality of algorithms respectively, wherein the parameter indicators are one-to-one corresponding to the parameters;
   conducting a correlation analysis between each of parameter indicators and the event indicative values, thereby obtaining a plurality of correlation coefficients one-to-one corresponding to the parameter indicators;
   selecting one of the parameter indicators that is corresponding to a maximum one of the correlation coefficients as an aging feature, and setting an auxiliary aging feature, wherein the auxiliary aging feature is another of the parameter indicators and is not corresponding to the maximum one of the correlation coefficients;
   performing a first determination operation to determine if one of the workpieces is set as a sample selection point according to the value of the aging feature corresponding to each of the workpieces when processing the one of the workpieces;
   performing a multiple-variable model-building operation, wherein the multiple-variable model-building operation comprises:
      using N values of the aging feature and N values of the auxiliary aging feature as a set of model-building sample data, wherein the N values of the aging feature are corresponding to N sets of the sets of process data belonging to successive N of the workpieces that are processed directly before the sample selection point, wherein N is a positive integer;
      performing a Granger causality test on the aging feature and the auxiliary aging feature to determine a correlation between the aging feature and the auxiliary aging feature, wherein if there is no correlation between the aging feature and the auxiliary aging feature, deleting the auxiliary aging feature from the set of model-building sample data;
      building an aging-feature prediction model by using the set of model-building sample data in accordance a multiple-variable time series prediction algorithm, thereby obtaining a plurality of predicted values of the aging feature that are arranged in a processing order;
   obtaining a plurality of time points at which the component processes the workpieces respectively in accordance with a plurality of process times used by the component for processing the workpieces respectively;
   obtaining a dead spec that is a value of the aging feature used or generated by the component when the component cannot work; and
   sequentially determining if the predicted values are substantially equal to the dead spec until an earliest one of the predicted values is found, wherein one of the time points corresponding to the earliest one is a death time point at which the component cannot work.

11. The non-transitory tangible computer readable recording medium as claimed in claim 10, wherein the first determination operation comprises:
   converting the values of the aging feature in each of the sets of process data to a plurality of device health indices (DHI) in accordance with a set of conversion formulas as follows:

when $\bar{y}_T < y_T < UCL$, $$DHI = \bar{y}_{T\_mapping} - \left(\frac{y_T - \bar{y}_T}{UCL - \bar{y}_T} \times (\bar{y}_{T\_mapping} - UCL_{\_mapping})\right);$$

when $UCL < y_T < USL$, $$DHI = UCL_{\_mapping} - \left(\frac{y_T - UCL}{USL - UCL} \times (UCL_{\_mapping} - USL_{\_mapping})\right);$$

when $USL < y_T < \text{Max } y_T$, $$DHI = USL_{\_mapping} - \left(\frac{y_T - USL}{\text{Max } y_T - USL} \times (USL_{\_mapping} - \text{Max } y_{T\_mapping})\right);$$

when $LCL < y_T < \bar{y}_T$, $$DHI = \bar{y}_{T\_mapping} - \left(\frac{\bar{y}_T - y_T}{\bar{y}_T - LCL} \times (\bar{y}_{T\_mapping} - LCL_{\_mapping})\right);$$

when $LSL < y_T < LCL$, $$DHI = LCL_{\_mapping} - \left(\frac{LCL - y_T}{LCL - LSL} \times (LCL_{\_mapping} - LSL_{\_mapping})\right);$$

when $\text{Min } y_T < y_T < LSL$, $$DHI = LSL_{\_mapping} - \left(\frac{LSL - y_T}{LSL - \text{Min } y_T} \times (\text{Min } y_{T\_mapping} - LSL_{\_mapping})\right);$$

wherein $y_T$ represents the aging feature, $\bar{y}_T$ represents a mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; LCL$_{mapping}$ is a conversion value corresponding to the LCL; USL$_{mapping}$ is a conversion value corresponding to the USL; and UCL$_{mapping}$ is a conversion value corresponding to the UCL; and sequentially determining if the device health indices are greater or equal to a threshold value until an earliest one of the device health indices is found, wherein one of the workpieces corresponding to the earliest one of the device health indices is set as the sample selection point.

12. The non-transitory tangible computer readable recording medium as claimed in claim 10, wherein the multiple-variable model-building operation further comprises:

building the aging-feature prediction model by using a vector autoregression (VAR) model as the multiple-variable time series prediction algorithm;

selecting the biggest lag of the VAR model by using a partial autocorrelation function (PACF);

performing a white noise test on the values of the aging feature in the set of model-building sample data, wherein when one of the values of the aging feature in the set of model-building sample data is a white noise, a value of the aging feature corresponding to another set of process data belonging to a (N+1)$^{th}$ workpiece processed before the sample selection point is added to the set of model-building sample data;

creating a plurality of VAR model combinations by using the biggest lag of the VAR model;

calculating an information quantity of each of the VAR model combinations by using an information criterion algorithm; and selecting one of the VAR model combinations that has the biggest information quantity as an optimal model.

13. The non-transitory tangible computer readable recording medium as claimed in claim 12, wherein the information criterion algorithm is a Bayesian information criterion (BIC).

14. The non-transitory tangible computer readable recording medium as claimed in claim 10, wherein the multiple-variable model-building operation further comprises:

determining if variances of the values of the aging feature in the set of model-building sample data become larger with time, and performing a log transformation on each of the values of the aging feature in the set of model-building sample data when the variances of the values of the aging feature in the set of model-building sample data become larger with time; and performing a unit root test on the values of the aging feature in the set of model-building sample data to check if the values of the aging feature in the set of model-building sample data arranged in sequence is stationary, and performing a process of difference on each of the values of the aging feature in the set of model-building sample data when the values of the aging feature in the set of model-building sample data is not stationary.

15. The non-transitory tangible computer readable recording medium as claimed in claim 14, wherein the unit root test is an augmented Dickey-Fuller test (ADF test) or a Kwiatkowski-Phillips-Schmidt-Shin (KPSS) test.

16. The non-transitory tangible computer readable recording medium as claimed in claim 10, further comprising performing a second determination operation to determine if the component of the production tool needs replacement or maintenance, wherein the second determination operation comprises:

converting the predicted values of the aging feature to a plurality of death correlation indices (DCI) in accordance with a set of conversion formulas as follows:

$$DCI_t = \frac{conv(y_{death}, y_{t-1})}{\text{Var}(y_{death})},$$

wherein $y_{death}$ is the predicted value of the aging feature when the component cannot work, $y_{t-1}$ is the value of the aging feature corresponding to a (t−1)$^{th}$ workpiece processed by the component, conv is a covariance computation, and Var is a variance computation; and when $DCI_t$ is greater than a threshold, it means that the component is near a dead state when processing a $t^{th}$ workpiece, wherein the threshold is based on a standard error of $DCI_t$, and t is an integer.

17. The non-transitory tangible computer readable recording medium as claimed in claim 10, wherein the component comprises a heater, a pressure module, a throttle valve, an oilless bushing or a bearing, and the parameters comprise a shaft deflection, a valve opening angle, a vibration amplitude, a driving voltage, a driving current, a temperature and/or a pressure.

18. The non-transitory tangible computer readable recording medium as claimed in claim 10, wherein the parameter indicators comprise a k-times frequency feature (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value.

* * * * *